UNITED STATES PATENT OFFICE.

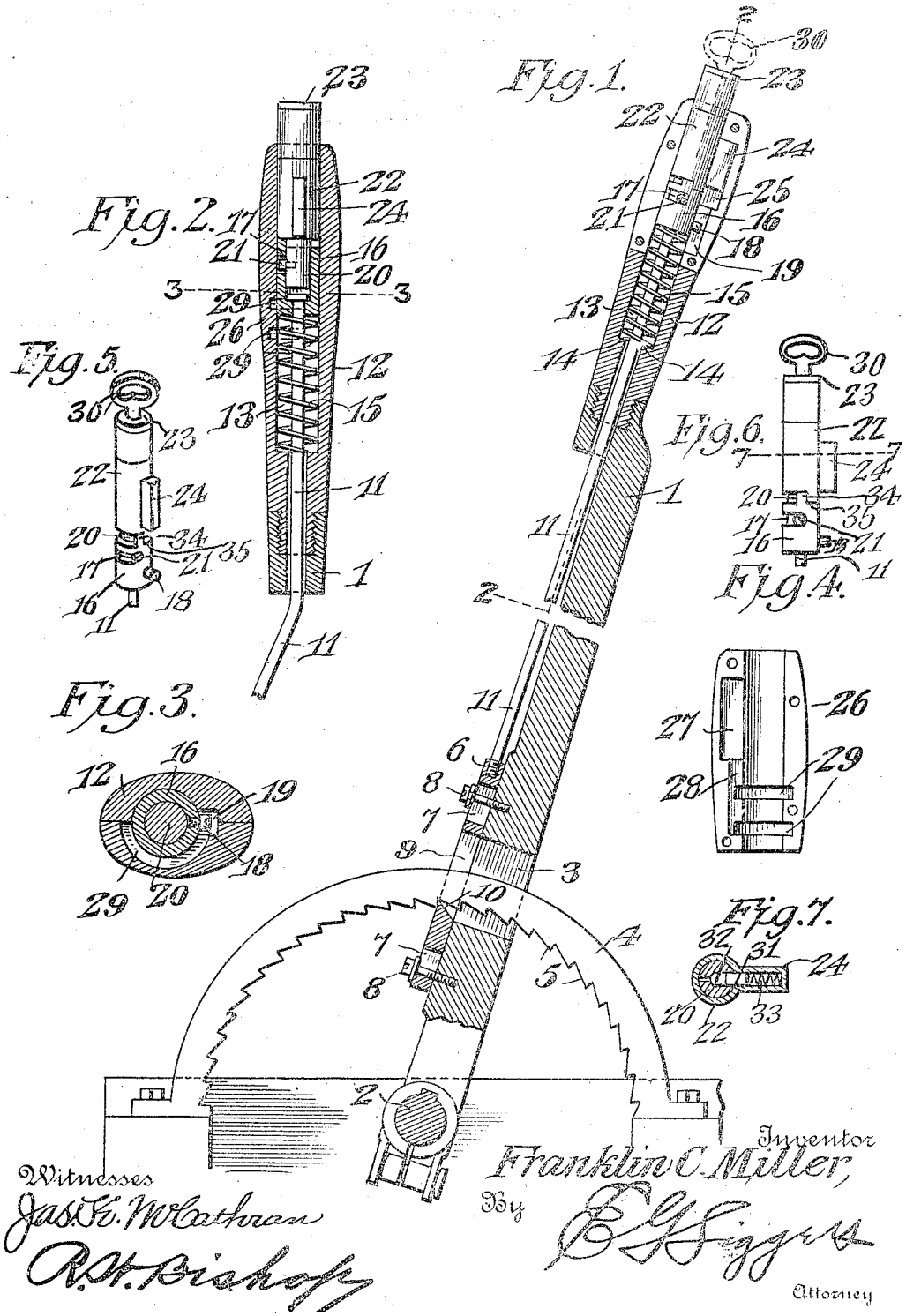

FRANKLIN C. MILLER, OF EASTON, PENNSYLVANIA.

AUTOMOBILE CONTROLLER-LEVER LOCK.

999,462.   Specification of Letters Patent.   Patented Aug. 1, 1911.

Application filed March 7, 1910. Serial No. 547,808.

*To all whom it may concern:*

Be it known that I, FRANKLIN C. MILLER, a citizen of the United States, residing at Easton, in the county of Northampton and State of Pennsylvania, have invented a new and useful Automobile Controller - Lever Lock, of which the following is a specification.

This invention has reference to controllers for automobiles, and the principal object of the invention is to simplify the construction and arrangement of parts in devices of the character shown in an application for patent filed by me April 26, 1909, Serial No. 492,189.

The stated object and such other objects as will appear hereinafter are attained by the use of the mechanism illustrated in the accompanying drawings, and the present invention consists in certain novel features of the same which will be hereinafter first fully described and then more particularly pointed out in the appended claims.

In the drawings, Figure 1 is a sectional elevation of a controller equipped with my present improvements. Fig. 2 is a longitudinal sectional view taken on the line 2—2 of Fig. 1. Fig. 3 is a horizontal section taken on line 3—3 of Fig. 2. Fig. 4 is a detail elevation of a portion of the handle. Fig. 5 is a detail perspective view of the combined push button and lock. Fig. 6 is a detail side view of the same, and Fig. 7 is a detail section on the line 7—7 of Fig. 6.

My invention is applicable to any of the operating levers ordinarily provided on an automobile, either for operating the brake, changing the speed gear, or stopping the engine. The invention may be applied to any of these levers, and in the drawings, a lever 1 is shown secured to a rock shaft 2 and provided with a longitudinally-disposed slot 3 near its lower end through which passes a sector 4 having teeth 5 on its under edge. The lever 1 is equipped with a holding means comprising a slide 6 provided with longitudinal slots 7 through which securing screws 8 are inserted into the lever to maintain the slide in its proper relative position, while between the said slots 7 the slide is provided with a longitudinally - disposed slot 9 through which the sector 4 passes, a tooth 10 being formed at the lower end of the slot 9 to engage the rack on the under edge of the sector, whereby the lever will be held in the position to which it may be adjusted. A link or connecting rod 11 rises from the upper end of the slide 6 and this link or connecting rod may be formed integral with the slide or secured to the same in any desired manner, the drawings showing the rod as threaded into the upper end of the slide. The lever is provided with a handle 12 having a longitudinally-arranged chamber 13 into which the upper end of the link or connecting rod 11 extends, and the said chamber 13 is of less diameter in its lower portion than in its upper portion, whereby an annular shoulder 14, upon which may rest a spring 15, coiled around the link or connecting rod 11, is formed. Upon the upper end of the said link, I swivel a sleeve or thimble 16 having a semi-annular slot 17 near its upper end and provided with a radial projection 18 near its lower end. The projection 18 normally lies within a longitudinally-disposed recess 19 in the handle and is adapted to slide in the said recess, this sliding movement being transmitted to the sleeve or thimble by the push button when it is desired to actuate the holding means consisting of the link 11 and the slide 6 in order to permit the controller or lever 1 to be moved forward. The sleeve or thimble 16 receives the lower end of a cylinder 20 which carries a projection 21 playing in the semi-annular slot 17 of the sleeve or thimble, and this cylinder 20 extends through a casing 22 and projects beyond the upper end of the same to constitute a push button beyond the upper end of the handle 12, as shown at 23, and is provided in said end with a radial slot or key hole to receive a key 30. The casing 22 is provided with a rib or offset 24 engaging a recess 25 in the handle, whereby the said casing may have a longitudinal sliding movement in the handle but will be prevented from rotating therein. The key 30 operates the coacting tumbler pins 31 and 32, the former of which is pressed by a spring 33 housed in the offset chamber 24 of the casing or barrel 22. The cylinder is adapted to make one complete rotation so that the key 30 can be inserted to operate the lock and be removed after the latter is in locking position. The thimble is actuated by the projection 21 of the cylinder impinging against the end of the slot 17 and the upper end of the thimble is provided with a projection or lug 34 which is adapted to engage approximately diametrically disposed shoulders 35, one of which is shown in Figs. 5 and 6, so that the thimble can make half a rotation and thereby bring the projection 18 into engagement with the groove 29 and consequently prevent the longitudinal sliding movement of the thimble and the push button. The slot 17 and the projection or pin 21 constitute a lost motion connection between the thimble and the cylinder.

In order to facilitate the assembling of the parts, the handle is composed of two members, the smaller member, or plate 26 being provided with recesses 27 and 28 registering with the recesses 25 and 19, respectively, to accommodate the offset 24 and the projection 18 and is also provided with one or more transverse grooves 29 adapted to receive the projection 18 when the sleeve or cylinder 16 is rotated and thereby prevent sliding movement of the said sleeve or cylinder and, consequently, lock the holding means against movement so that the controller cannot be operated and tampering with the automobile during the owner's absence will be positively prevented. The cylinder 20 and the push button will be controlled by the key 30, which key will, of course, always remain in the possession of the owner or the chauffeur.

With the parts arranged as shown in Fig. 1, the controller or lever may be actuated by pressing inward on the push button so as to press the sleeve 16 downward against the tension of the spring 15 and thereby actuate the slide 6 to remove the tooth 10 from engagement with the rack 5. The lever or controller may be then shifted to the desired position and the pressure on the push button released, whereupon the slide will automatically engage the rack under the influence of the spring 15 and hold the controller in its adjusted position. Should the owner of the vehicle desire to leave the same temporarily, he inserts the key into the cylinder 20 and thereby releases the tumblers from the cylinder. The cylinder may then be rotated and the projection 21 will then ride through the slot 17 to the opposite end of the same and will thereafter actuate the sleeve 16 so as to carry the projection 18 into engagement with one of the grooves 29 and, consequently, by the said engagement, prevent longitudinal sliding movement of the sleeve. The shoulders 35 and the lug 34 serve to arrest the rotation of the thimble or sleeve 16 at the end of a half revolution so that the parts cannot be carried into such relative positions as will interfere with the proper operation of the device. Rotation of the key and the cylinder in the opposite direction will restore the parts to their normal position so that the longitudinal sliding movement of the sleeve and the holding means may be again effected.

It will be observed that in my present device, a single spring serves to hold the holding means in engagement with the rack or sector and also to project the push button into its normal position, where it may be readily engaged by the thumb of the chauffeur in order to operate the several parts. It will be noted that the projection 21 is capable of a slight movement within the slot 17 and that the end of the cylinder 20 may be thereby brought against the upper end of the connecting rod so that the downward movement of the cylinder imparted thereto through the push button will be transmitted directly to the connecting rod by the end of the cylinder coming into contact with the button or head at the upper end of the rod. The number of parts are reduced and the construction is simplified so that the expense of manufacture is minimized.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. The combination of a controller having a chambered handle at its outer end, holding means for the controller including a reciprocatory member located alongside the controller and projecting at one end into the handle, a combined actuating and key-released locking device arranged within the said chambered handle and swiveled upon the end of said reciprocatory member, said device normally projecting at one end from the outer end of the handle so as to form a push button, whereby the reciprocatory member may be actuated and released by pressing inwardly on the push button, said push button having a key-hole to receive a key for locking it against such inward movement, and a spring for holding the push button in said projecting relation.

2. The combination of a controller, a holding means therefor including a reciprocatory member mounted on the controller, a push button mounted in the handle end of the controller, a device mounted on the reciprocatory member and adapted to operatively connect the same with the push button, and a key controlled means within the handle end of the controller for effecting rotary movement of the push button to throw said connecting device into and out of inoperative position.

3. The combination of a pivoted controller having a chambered handle at its outer end, a rigidly mounted sector, a slide mounted on the controller and adapted to engage the sector, a link rising from the slide and extending along the controller into the chambered handle thereof, a combined actuating and key-released locking device mounted on the upper end of the link within the chamber of the handle, and a spring within the handle bearing upwardly against the lower end of the combined actuating and locking device, whereby a single spring serves to hold the slide in engagement with the sector and also actuates the locking device.

4. The combination of a controller having a chambered handle at its outer end, holding means for the controller, a combined actuating and key-released locking device arranged in the said chambered handle and connected with the holding means, a portion of the said device projecting out of the chambered handle to form a push button and permanently attached to the portion within the chambered handle, and a single spring within the chamber of the handle for holding the push button end of the said device in projecting relation and the holding means in its engaged position.

5. The combination of a controller having a chambered handle, holding means for the controller, a device arranged in the chambered handle for actuating the holding means, said device comprising a member projecting out of the chamber to form a push button, a key-released means for locking the member in different positions, and a sleeve carried by said member and movable into and out of locking engagement with the chambered handle and connected with the holding means.

6. The combination of a controller having a chambered handle provided with an internal transverse groove, a holding means for the controller, and a device arranged within the handle to actuate the holding means, said device comprising a member projecting from the chambered handle to form a push button, a sleeve carried by said member and connected with the holding means and provided with a projection playing normally in the chamber of the handle and adapted to engage the transverse groove therein, and key-released means for permitting the sleeve to rotate to bring the projection thereon into engagement with the transverse groove in the handle.

7. The combination of a controller having a chambered handle provided with an internal transverse groove and an annular shoulder, a holding means for the controller projecting into the chamber in the handle, a sleeve having a swiveled connection with the holding means, a spring bearing against the annular shoulder in the handle and against the end of the sleeve, a cylinder having one end fitting within the said sleeve and adapted to actuate the same and its opposite end projecting from the handle to form a push button, and means on the sleeve to engage the handle whereby movement of the sleeve longitudinally of the handle will be prevented.

8. The combination of a controller having a chambered handle provided with a longitudinally-disposed recess and having a transverse groove communicating with said recess, a holding device for the controller projecting into the chamber in the handle of the same, a sleeve having a swiveled connection with the said holding means and provided with a projection playing in the longitudinal recess and adapted to engage the transverse groove, a spring disposed within the chamber of the handle and acting on the said sleeve to normally hold the same and the holding means toward the end of the handle, and means for imparting a sliding movement to the sleeve in opposition to the said spring and carrying key-controlled means for imparting a rotary movement to the sleeve to cause the projection thereon to engage the transverse groove and thereby prevent the sliding movement of the sleeve.

In testimony, that I claim the foregoing as my own, I have hereto affixed my signature in the presence of two witnesses.

FRANKLIN C. MILLER.

Witnesses:
RUSSEL D. WELCH,
FRANCES J. WAMSLEY.